(12) United States Patent
Fukatsu et al.

(10) Patent No.: US 9,246,157 B2
(45) Date of Patent: Jan. 26, 2016

(54) SEALED SECONDARY BATTERY AND MANUFACTURING METHOD THEREFOR

(75) Inventors: Kenta Fukatsu, Fujisawa (JP);
Tomohiro Matsui, Kitakyushu (JP);
Tatsuya Nishi, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 13/220,090

(22) Filed: Aug. 29, 2011

(65) Prior Publication Data

US 2012/0070722 A1    Mar. 22, 2012

(30) Foreign Application Priority Data

Sep. 21, 2010    (JP) ................. 2010-211277

(51) Int. Cl.
*H01M 2/08*     (2006.01)
*H01M 10/04*    (2006.01)
*H01M 2/36*     (2006.01)
*H01M 2/04*     (2006.01)

(52) U.S. Cl.
CPC .......... *H01M 2/365* (2013.01); *H01M 10/0436* (2013.01); *H01M 2/0426* (2013.01); *Y10T 29/4911* (2015.01)

(58) Field of Classification Search
CPC  H01M 2/365; H01M 2/0426; H01M 10/0436
USPC ....................................... 429/185
See application file for complete search history.

(56) References Cited

U.S. PATENT DOCUMENTS

2010/0159320 A1*   6/2010  Kim et al. ............ 429/178
2011/0039154 A1*   2/2011  Komatsuki et al. ...... 429/185

FOREIGN PATENT DOCUMENTS

| CN | 1350336 | 5/2002 |
|---|---|---|
| CN | 1794512 | 6/2006 |
| JP | 2000-268811 | 9/2000 |
| JP | 2007-66600 | 3/2007 |
| JP | 4111621 | 4/2008 |
| JP | 2008-147069 | 6/2008 |
| JP | 2009-48963 | 3/2009 |
| JP | 2009-199819 | 9/2009 |
| JP | 2009-259701 | 11/2009 |

OTHER PUBLICATIONS

Abstract of JP 2008-147069, obtained May 20, 2013.*
Machine translation of JP 2009-48963, obtained Dec. 10, 2013.*
Japanese Office Action issued Jul. 24, 2012, in Japan Patent Application No. 2010-211277 (with English Translation).
Office Action issued Oct. 23, 2013, in Chinese Patent Application No. 201110226307.X, (with English-language translation).

* cited by examiner

*Primary Examiner* — Nicholas P D'Aniello
(74) *Attorney, Agent, or Firm* — Oblon, McClelland, Maier & Neustadt, L.L.P.

(57) ABSTRACT

According to one embodiment, a sealed secondary battery is provided with a container body having an opening and accommodating an electrode assembly and an electrolyte, a sealing plate which seals the opening of the container body, the sealing plate having an injection hole which is formed penetrating the sealing plate and through which the electrolyte is injected into the container body, and a sealing body positioned with an annular vacant space above a surface region of the sealing plate around the injection hole therein and welded at a peripheral edge portion thereof to the sealing plate, thereby sealing the injection hole.

5 Claims, 5 Drawing Sheets

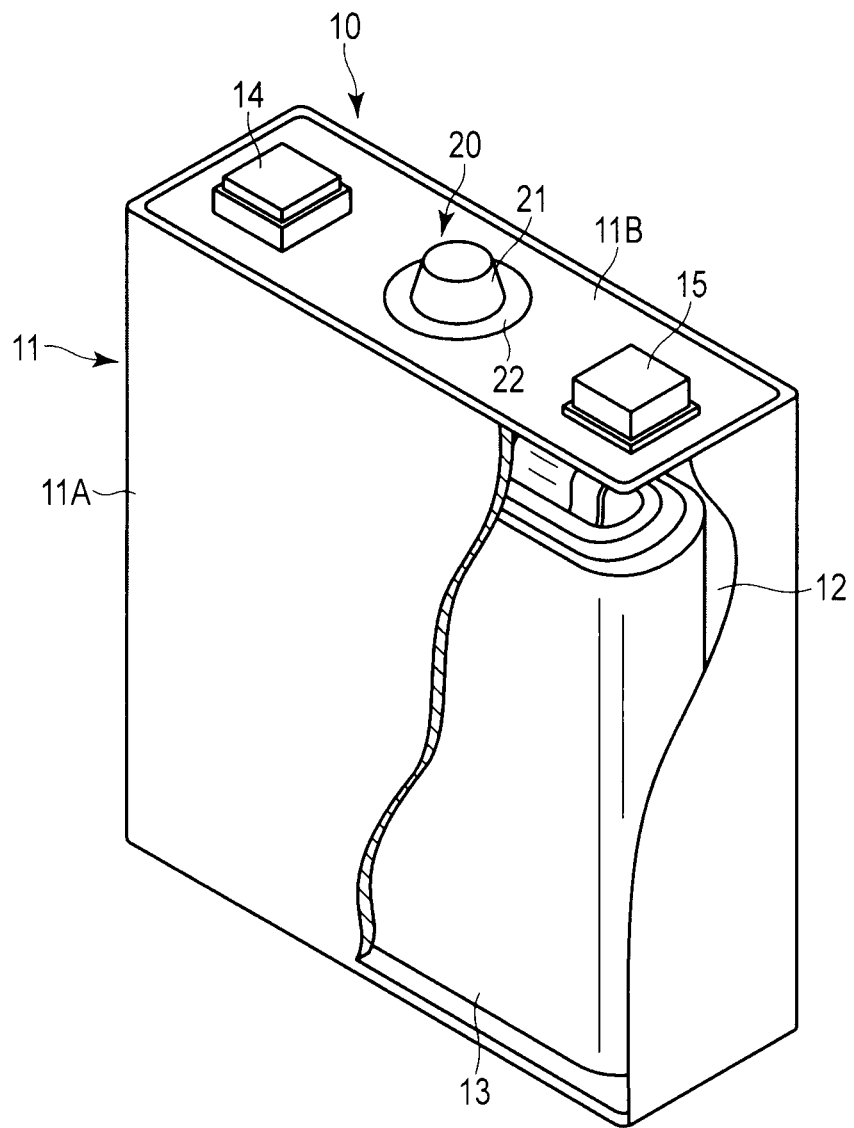
F I G. 1

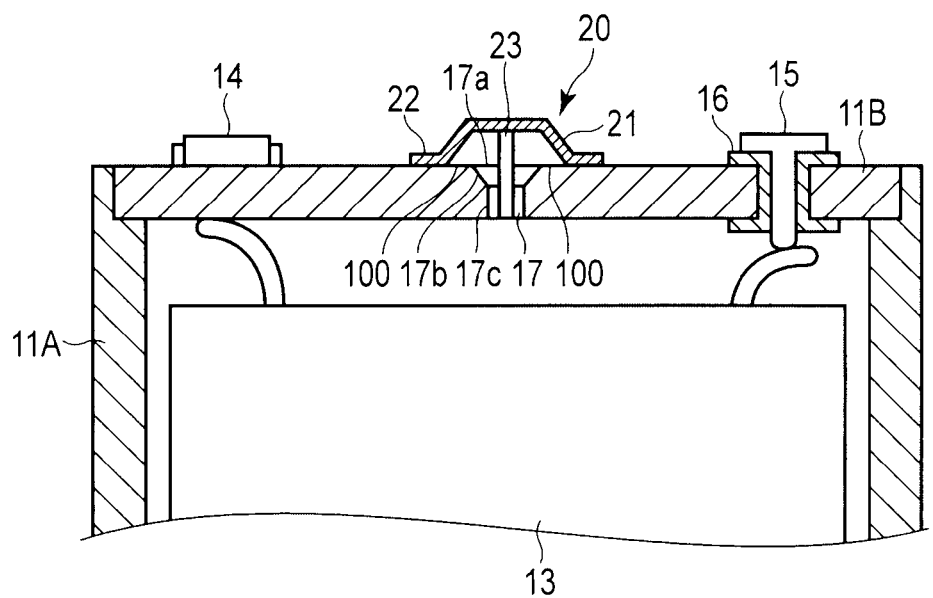
F I G. 2
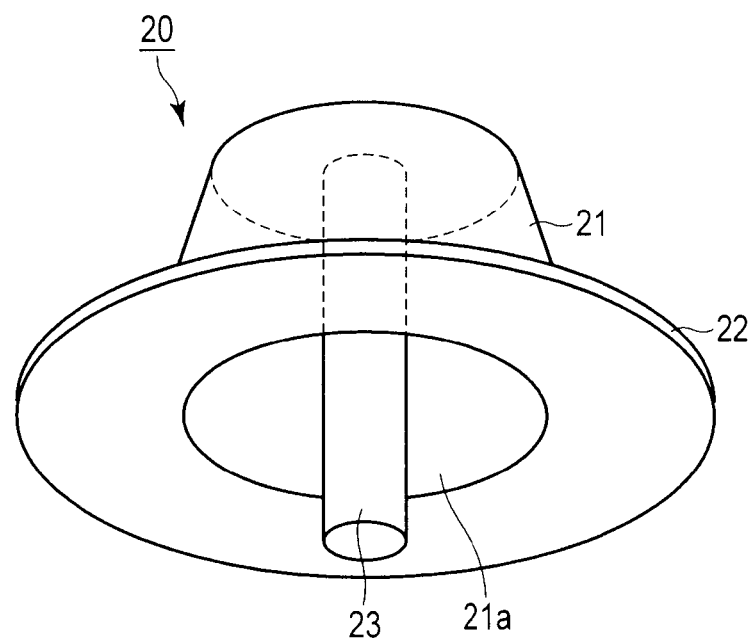
F I G. 3

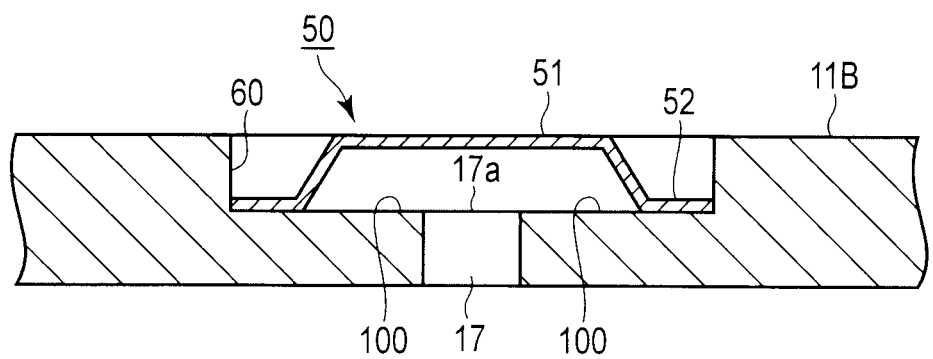
F I G. 5
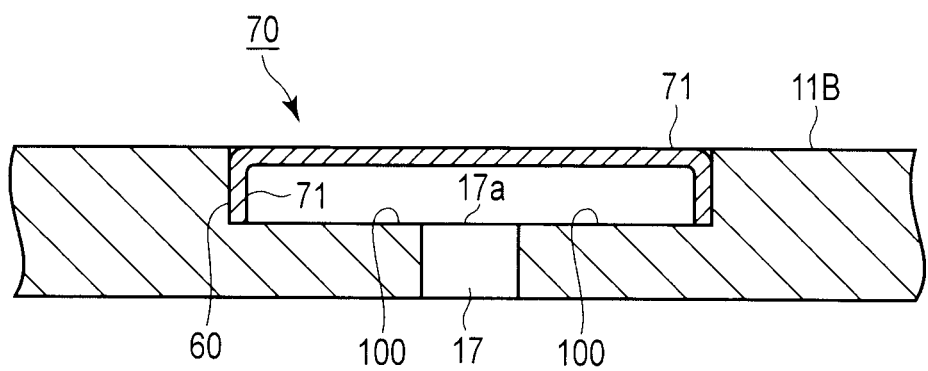
F I G. 6

SEALED SECONDARY BATTERY AND MANUFACTURING METHOD THEREFOR

CROSS-REFERENCE TO RELATED APPLICATIONS

This application is based upon and claims the benefit of priority from prior Japanese Patent Application No. 2010-211277, filed Sep. 21, 2010, the entire contents of which are incorporated herein by reference.

FIELD

Embodiments described herein relate generally to a sealed secondary battery and a manufacturing method therefor.

BACKGROUND

In recent years, sealed secondary batteries each in the form of a flat rectangular box have become widely used in portable electronic apparatuses and the like. An external container of one such secondary battery normally comprises an open-topped metallic container body and metallic sealing plate. The container body is in the form of a flat rectangular box. The sealing plate is welded to the container body, thereby closing its opening. In a manufacturing method for a sealed secondary battery, battery elements are first arranged in the container body before the sealing plate is welded to the container body. Then, the sealing plate is welded to the container body to form the sealed secondary battery. Subsequently, an electrolyte is injected into the container body through an injection hole formed in the sealing plate. When the injection of the electrolyte is finished, the injection hole is sealed with a sealing body in a reduced-pressure ambience.

BRIEF DESCRIPTION OF THE DRAWINGS

FIG. 1 is a perspective view showing an appearance of a sealed secondary battery according to a first embodiment;

FIG. 2 is a sectional view showing a principal part of the sealed secondary battery of the first embodiment;

FIG. 3 is a perspective view showing a sealing body of the sealed secondary battery of the first embodiment;

FIG. 5 is a sectional view showing a principal part of a sealed secondary battery according to a second embodiment;

FIG. 6 is a sectional view showing a principal part of a sealed secondary battery according to a third embodiment;

DETAILED DESCRIPTION

Figure 4:
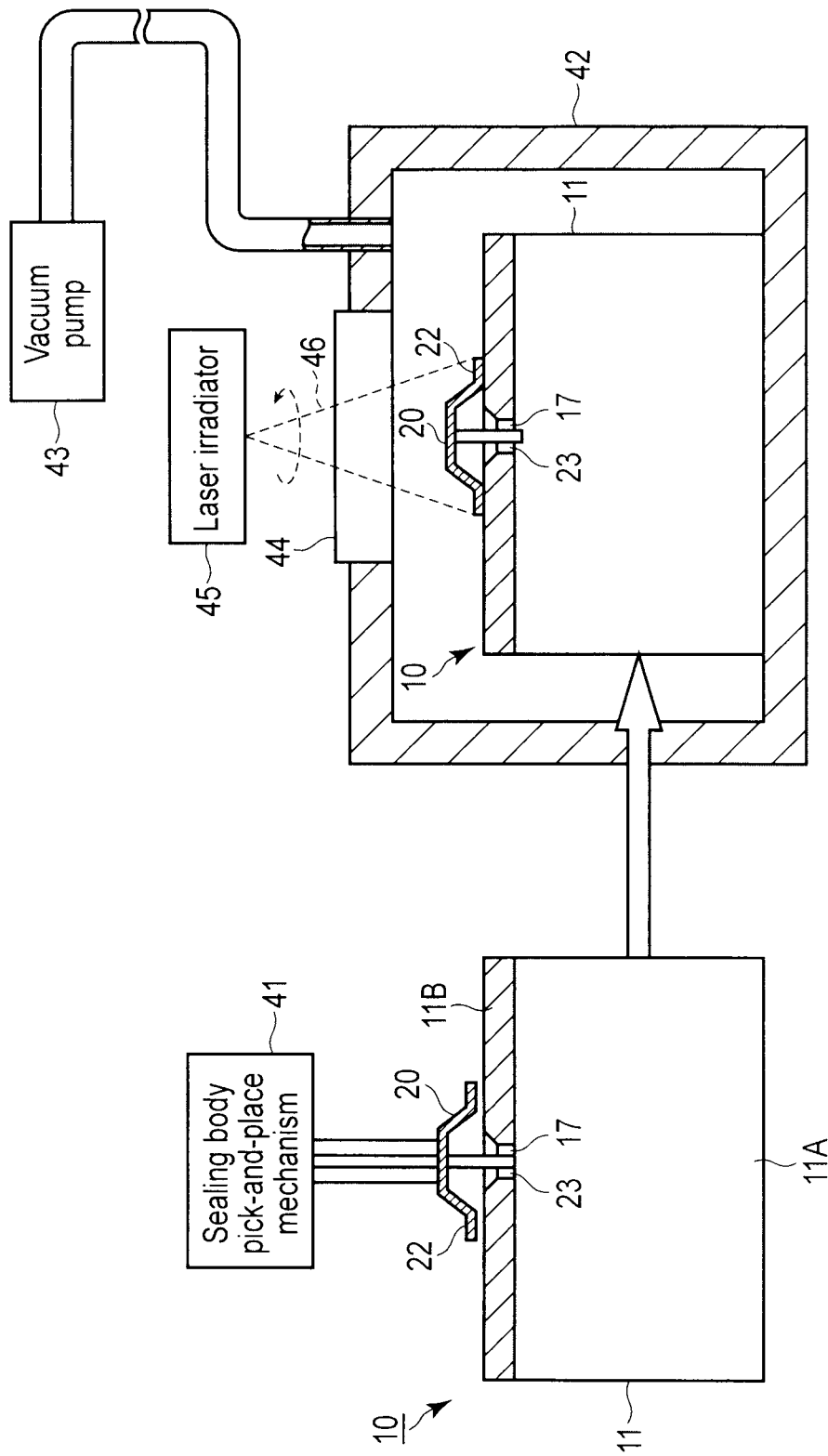
FIG. 4 is a diagram for illustrating manufacturing processes for the sealed secondary battery of the first embodiment.

In general, according to one embodiment, a sealed secondary battery comprises a container body comprising an opening and accommodating an electrode assembly and an electrolyte, a sealing plate which seals the opening of the container body, the sealing plate comprising an injection hole which is formed penetrating the sealing plate and through which the electrolyte is injected into the container body, and a sealing body positioned with an annular vacant space above a surface region of the sealing plate around the injection hole therein and welded at a peripheral edge portion thereof to the sealing plate, thereby sealing the injection hole.

Embodiments of a sealed secondary battery and a method for manufacturing the same will now be described in detail with reference to the accompanying drawings.

(First Embodiment)

FIG. 1 is a perspective view showing an appearance of a sealed secondary battery 10 according to a first embodiment, FIG. 2 is a sectional view showing a part of the sealed secondary battery 10, and FIG. 3 is a perspective view showing a sealing body 20.

As shown in FIGS. 1 and 2, the sealed secondary battery 10 comprises an external container 11 of a metal, such as aluminum, in the form of a flat box. A non-aqueous electrolyte 12 and electrode assembly 13 are accommodated in the external container 11. The external container 11 comprises an open-topped container body 11A and rectangular sealing plate 11B, which seals an opening of the container body 11A.

The sealing plate 11B is placed on an end face of the opening of the container body 11A such that its entire periphery is welded thereto, thereby sealing the opening. Thus, the container body 11A and sealing plate 11B are integrated without a gap, thereby forming the sealed external container 11.

A positive electrode terminal 14 and negative electrode terminal 15 are arranged individually on the longitudinally opposite end portions of the sealing plate 11B such that they project from the sealing plate 11B. The positive and negative electrode terminals 14 and 15 are connected to positive and negative electrodes, respectively, of the electrode assembly 13.

The electrode assembly 13 is a flat rectangular plate formed by coiling positive and negative electrode plates with a separator sandwiched therebetween and radially compressing the resulting structure.

As shown in FIG. 2, the negative electrode terminal 15 extends, penetrating the sealing plate 11B. A seal member, e.g., a gasket 16, of an insulator such as synthetic resin or glass is interposed between the negative electrode terminal 15 and sealing plate 11B. The gasket 16 hermitically seals the negative electrode terminal 15 and sealing plate 11B and electrically insulates them from each other.

An injection hole 17 through which the non-aqueous electrolyte 12 is injected into the external container 11 is formed penetrating the central part of the sealing plate 11B. The injection hole 17 comprises a circular opening 17a in the surface of the sealing plate 11B. The injection hole 17 comprises a slope portion 17b and hole portion 17c and internally communicates with the external container 11. The slope portion 17b is gradually tapered from the peripheral edge of the opening 17a toward its thicknesswise middle portion. The hole portion 17c is bored through the sealing plate 11B, extending with a uniform diameter from the middle portion of the slope portion 17b to the reverse side of the sealing plate 11B. The injection hole 17 is sealed by the sealing body 20 welded to the sealing plate 11B.

As shown in FIGS. 1 to 3, the sealing body 20 comprises a hollow member 21 in the shape of a frustum of a cone, annular collar portion 22, and rod-like protrusion 23. One end face of the hollow member 21 opens in a circular shape, the other end face being closed. The collar portion 22 is disposed on the outer edge of the hollow member 21 on the one end face side. The protrusion 23 extends at right angles from the central part of the inside of the other end face of the hollow member 21. The hollow member 21, collar portion 22, and rod-like protrusion 23 are all formed of a metal such as aluminum.

An opening 21a on the one end face side of the hollow member 21 is larger in diameter than the opening 17a of the injection hole 17. The rod-like protrusion 23 is just long enough to project from the one end face side of the hollow member 21 by a distance substantially equal to the thickness of the sealing plate 11B. Further, the outside diameter of the protrusion 23 is smaller than the inside diameter of the hole portion 17c of the injection hole 17.

As shown in FIG. 2, the sealing body 20 is placed on the sealing plate 11B so that the hollow member 21 covers the opening 17a of the injection hole 17 from its one end face side with the rod-like protrusion 23 passed through the injection hole 17. Further, the peripheral edge portion of the collar portion 22 is welded to the sealing plate 11B by laser welding or the like.

As described before, the opening 21a of the hollow member 21 is larger than the opening 17a of the injection hole 17. Further, the outside diameter of the rod-like protrusion 23 is smaller than the inside diameter of the hole portion 17c of the injection hole 17. If the protrusion 23 on the hollow member 21 is introduced into the injection hole 17 so that the hollow member 21 is placed on the sealing plate 11B from its one end face side, thereby covering the injection hole 17 of the injection hole 17, an annular vacant space 100 is formed between the outer periphery of the opening 17a and the inner periphery of the opening 21a of the hollow member 21. Thus, the sealing body 20 is positioned on that surface region of the sealing plate 11B which surrounds the injection hole 17 with the annular vacant space 100 above the surrounding region, and the peripheral edge portion of the collar portion 22 is welded to the sealing plate 11B, thereby sealing the injection hole 17.

A method for manufacturing the sealed secondary battery 10 constructed in this manner will now be described with reference to FIG. 4.

The container body 11A, electrode assembly 13, and sealing plate 11B on which the electrode terminals 14 and 15 are mounted are prepared first. After the battery elements including the electrode assembly 13 are then arranged in the container body 11A, the sealing plate 11B is placed on the end face of the opening of the container body 11A, and the entire periphery of the sealing plate 11B is welded to form the external container 11. As this is done, the electrode assembly 13 is electrically connected to the electrode terminals 14 and 15.

Then, the non-aqueous electrolyte 12 is injected into the external container 11 accommodating the electrode assembly 13 through the injection hole 17 in the sealing plate 11B. This injection is performed using, for example, an electrolyte injector under atmospheric pressure. The electrolyte injector comprises a tank accommodating the electrolyte 12, a nozzle communicating with the tank, and a pump configured to internally pressurize the tank and deliver the electrolyte 12 through the nozzle. An injection port smaller than a hole portion 17c of the injection hole 17 is formed in the distal end of the nozzle. In starting the injection, the injection port of the nozzle is introduced through the injection hole 17, and the injection port and injection hole 17 are hermetically connected.

In this state, the pump is driven to pressurize the non-aqueous electrolyte 12 in the tank so that the electrolyte 12 is injected from the nozzle into the external container 11 through the injection hole 17.

After the electrolyte 12 is injected in a predetermined amount, the nozzle is removed from the injection hole 17. Subsequently, a sealing body pick-and-place mechanism 41 is used to draw and convey the sealing body 20 with its collar portion 22 downward, whereupon the rod-like protrusion 23 of the sealing body 20 is introduced into the injection hole 17, thereby positioning the sealing body 20 in place, as shown in FIG. 4.

If the sealing body 20 is thus positioned on the surface region of the sealing plate 11B around the injection hole 17 with the annular vacant space 100 above the surrounding region, it is released from attraction by the sealing body pick-and-place mechanism 41. In this way, the sealing body 20 is placed on the sealing plate 11B of the external container 11.

Then, the external container 11, having the sealing body 20 placed on the surface of its sealing plate 11B, is transferred into a decompression chamber 42, as shown in FIG. 4. The transfer means for the external container 11 is not limited specifically. The external container 11 may be conveyed into the decompression chamber 42 by means of a conveying mechanism such as a belt conveyor. Alternatively, the external container 11 may be manually introduced into the decompression chamber 42.

The decompression chamber 42 has an opening in a substantially central part of its top plate, and a glass window 44 closely contacts the opening. A laser irradiator 45 for laser welding is mounted above the glass window 44. A laser beam 46 emitted from the laser irradiator 45 is transmitted through the glass window 44 into the decompression chamber 42. The position thus reached by the laser beam is a laser-welding position. The transferred external container 11 is accommodated in the decompression chamber 42 in such a manner that the sealing body 20 on the surface of its sealing plate 11B is located in the laser-welding position.

After the external container 11 is correctly accommodated in the decompression chamber 42, a sealed state is established in the chamber 42. Thereafter, a vacuum pump 43 is driven to reduce the pressure in the decompression chamber 42 to a level lower than that in the external container 11. Thereupon, the sealing body 20 is slightly raised above the surface of the sealing plate 11B, and the pressure in the external container 11 is reduced through the resulting gap. After the pressure reduction, the laser irradiator 45 is driven to laser-weld the peripheral edge portion of the collar portion 22 of the sealing body 20 to the sealing plate 11B, thereby sealing the injection hole 17.

Thus, in the manufacturing method of the present embodiment, the hollow sealing body 20 is placed on the sealing plate 11B of the external container 11, which is injected with the non-aqueous electrolyte 12, in such a manner that the sealing body covers the injection hole 17. Thereafter, the external container 11, carrying the sealing body 20 thereon, is transferred to the laser-welding position in the decompression chamber 42, and decompression and laser welding of the sealing body 20 are performed.

Thus, the operation for placing the sealing body 20 on the sealing plate 11B so as to cover the injection hole 17 can be achieved under atmospheric pressure. In doing this, moreover, the sealing body 20 can be easily positioned in such a manner that the rod-like protrusion 23 on the sealing body 20 is passed through the injection hole 17. In addition, the protrusion 23 is in the injection hole 17 when the external container 11 carrying the sealing body 20 thereon is transferred into the decompression chamber 42. Therefore, there is no possibility of the sealing body 20 being disengaged from the injection hole 17 even if it is tilted or slid sideways. Thus, a manufacturing apparatus can be easily provided for the sealed secondary battery.

According to the manufacturing method of the present embodiment, moreover, the interior of the external container 11 is not airtight until the peripheral edge portion of the sealing body 20 is laser-welded to the sealing plate 11B. Specifically, the injection hole 17 is not hermetically sealed by the rod-like protrusion 23, although the latter is introduced into the former. If sealing by laser welding is insufficient during a leak test, tested products can be removed as poorly sealed. In other words, poorly welded secondary batteries can be reliably detected thereafter in the leak test. Thus, production of defective secondary batteries as products can be prevented.

In the sealed secondary battery 10 manufactured by the method of the present embodiment, furthermore, the annular vacant space 100 is secured above the surface region of the sealing plate 11B around the injection hole 17 therein. Thus, the non-aqueous electrolyte 12 can be confined to the vacant space 100 even if it is drawn up by the capillary phenomenon from a gap between the inner wall of the injection hole 17 and the rod-like protrusion 23 therein. Consequently, poor welding can be prevented from occurring as the electrolyte wets welds of the sealing body 20 and spreads.

(Second Embodiment)

FIG. 5 is a sectional view showing the vicinity of an injection hole 17 of a sealing plate 11B of a sealed secondary battery 10 according to a second embodiment. Like numbers are used to designate common portions shown in FIG. 2, and a detailed description of those portions is omitted.

In the present embodiment, a sealing body 50 comprises a hollow member 51 in the shape of a frustum of a cone and annular collar portion 52. One end face of the hollow member 51 opens in a circular shape, the other end face being closed. The collar portion 52 is disposed on the outer edge of the hollow member 51 on the one end face side.

A circular recess 60 is formed in a surface region of the sealing plate 11B of an external container 11 around the injection hole 17 therein. The recess 60 communicates with the injection hole 17 and is configured to be fitted with the sealing body 50 from one end face side thereof.

An opening on one end face side of the sealing body 50 is larger in diameter than an opening 17a of the injection hole 17. The depth of the recess 60 is substantially equal to the height of the hollow member 51 of the sealing body 50. Further, the inside diameter of the recess 60 is equal to or slightly larger than the outside diameter of the collar portion 52 of the sealing body 50.

If the sealing body 50 is mounted in the recess 60 with its collar portion 52 downward, therefore, the lower surface part of the collar portion 52 contacts the bottom surface part of the recess 60. Further, the peripheral edge portion of the collar portion 52 contacts the lower part of the sidewall of the recess 60 substantially throughout the circumference, whereby the sealing body 50 is positioned in place. When this is done, the injection hole 17 is closed by the sealing body 50.

In the second embodiment, the entire peripheral edge portion of the collar portion 52 of the sealing body 50 is laser-welded to the lower part of the sidewall of the recess 60, whereby the sealing body 50 is welded to the sealing plate 11B. In this way, the injection hole 17 is hermetically sealed by the sealing body 50.

The second embodiment arranged in this manner is similar to the first embodiment as regards the manufacturing processes for the sealed secondary battery 10. While the external container 11, having the sealing body 50 placed on its sealing plate 11B, is being transferred into a decompression chamber 42, the collar portion 52 of the sealing body 50 is in contact with the lower part of the sidewall of the recess 60, so that there is no possibility of the sealing body 50 being disengaged from the injection hole 17. Thus, the same function and effect as those of the first embodiment can be achieved.

Also in the sealed secondary battery 10 of the second embodiment, moreover, a vacant space 100 is secured above the surface region of the sealing plate 11B around the injection hole 17 therein, so that the same function and effect as those of the first embodiment can be achieved.

In addition, according to the second embodiment, the available sealing body 50 dispenses with the rod-like protrusion 23 of the sealing body 20 used in the first embodiment. Thus, the sealing body 50 is advantageous in being easier to produce and handle.

(Third Embodiment)

FIG. 6 is a sectional view showing the vicinity of an injection hole 17 of a sealing plate 11B of a sealed secondary battery 10 according to a third embodiment. Like numbers are used to designate common portions shown in FIG. 5, and a detailed description of those portions is omitted.

The present embodiment differs from the second embodiment in the shape of a sealing body 70. The sealing body 70 of the third embodiment is a hollow cylindrical member 71 having one end face opening in a circular shape and the other end face closed.

An opening on one end face side of the sealing body 70 is larger in diameter than an opening 17a of the injection hole 17. The height of the hollow member 71 is substantially equal to the depth of a recess 60. Further, the outside diameter of the sealing body 70 is equal to or slightly smaller than the inside diameter of the recess 60.

If the sealing body 70 is mounted in the recess 60 with its opening downward, therefore, the peripheral edge portion of the opening contacts the bottom surface part of the recess 60. Further, the outer peripheral portion of the hollow member 71 contacts the sidewall of the recess 60 substantially throughout the circumference, whereby the sealing body 70 is positioned in place. When this is done, the injection hole 17 is closed by the sealing body 70.

In the third embodiment, the entire peripheral edge portion of the sealing body 70 on the other end face side is laser-welded to the upper part of the sidewall of the recess 60, whereby the sealing body 70 is welded to the sealing plate 11B. In this way, the injection hole 17 is hermetically sealed by the sealing body 70.

The third embodiment arranged in this manner is similar to the first and second embodiments as regards the manufacturing processes for the sealed secondary battery 10. While the external container 11, having the sealing body 70 placed on its sealing plate 11B, is being transferred into a decompression chamber 42, the outer peripheral surface of the sealing body 70 is in contact with the sidewall of the recess 60, so that there is no possibility of the sealing body 70 being disengaged from the injection hole 17. Thus, the same function and effect as those of the first and second embodiments can be achieved.

Also in the sealed secondary battery 10 of the third embodiment, moreover, a vacant space 100 is secured above the surface region of the sealing plate 11B around the injection hole 17 therein, so that the same function and effect as those of the first and second embodiments can be achieved.

In addition, according to the third embodiment, the sealing body 70 can be constructed if opening and hollow portions are formed by cutting a columnar member from the one end face side. Thus, the sealing body 70 has an advantage over that of the second embodiment in being easier to produce.

(Fourth Embodiment)

Figure 7:
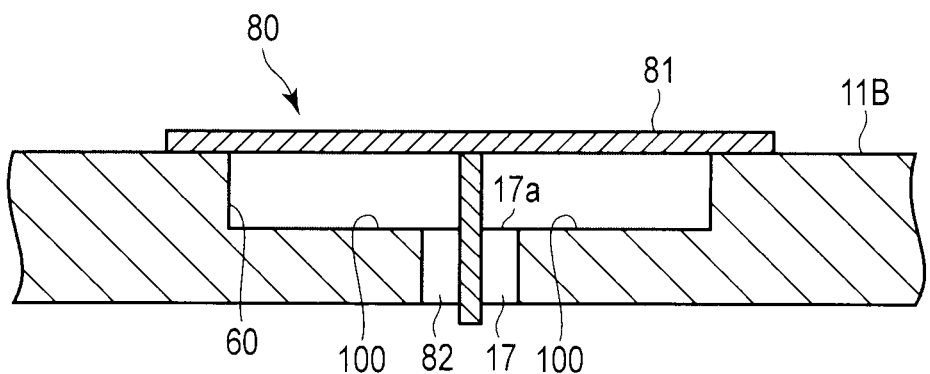
FIG. 7 is a sectional view showing a principal part of a sealed secondary battery according to a fourth embodiment.

FIG. 7 is a sectional view showing the vicinity of an injection hole 17 of a sealing plate 11B of a sealed secondary battery according to a fourth embodiment. Like numbers are used to designate common portions shown in FIGS. 5 and 6, and a detailed description of those portions is omitted.

The present embodiment differs from the second and third embodiments in the shape of a sealing body 80. The sealing body 80 of the fourth embodiment comprises a disk 81 and rod-like protrusion 82, which extends vertically from the center of the disk 81.

The outside diameter of the disk 81 is slightly larger than the sum of the respective inside diameters of the recess 60 and injection hole 17. The outside diameter of the rod-like protrusion 82 is slightly smaller than the inside diameter of the injection hole 17. Further, the length of the protrusion 82 is substantially equal to or slightly larger than the thickness of the sealing plate 11B.

If the rod-like protrusion 82 is introduced into the injection hole 17, therefore, the peripheral edge portion of the lower surface of the disk 81 contacts the surface of the sealing plate 11B so that the recess 60 is closed by the lower surface of the disk 81. In the fourth embodiment, the entire peripheral edge portion of the disk 81 is laser-welded to the surface of the sealing plate 11B, whereby the sealing body 80 is welded to the sealing plate 11B. In this way, the injection hole 17 is hermetically sealed by the sealing body 80.

In this arrangement, the rod-like protrusion 82 constitutes positioning means for positioning the sealing body 80 so as to close an opening of the recess 60, which is formed in a surface region of the sealing plate 11B around the injection hole 17 therein so as to communicate with the injection hole 17.

The fourth embodiment arranged in this manner is similar to the first to third embodiments as regards the manufacturing processes for the sealed secondary battery 10.

Thus, the same function and effect as those of the first to third embodiments can be achieved according to the fourth embodiment. In addition, according to the fourth embodiment, the sealing body 80 can be constructed by only providing the planar disk 81 with the rod-like protrusion 82, so that the sealing body 80 is easier to produce.

(Fifth Embodiment)

Figure 8:
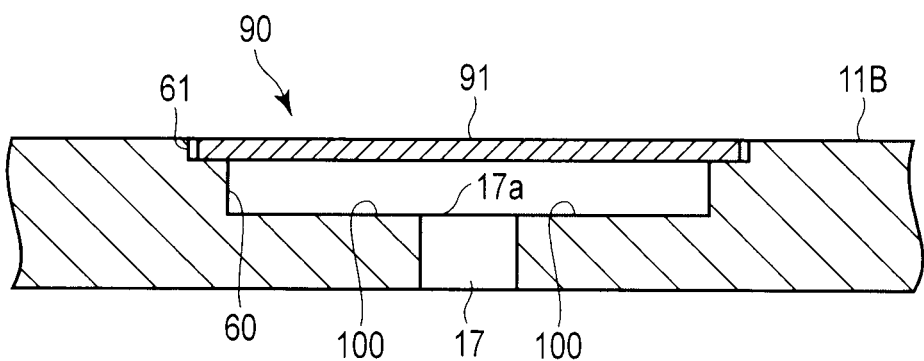
FIG. 8 is a sectional view showing a principal part of a sealed secondary battery according to a fifth embodiment.

FIG. 8 is a sectional view showing the vicinity of an injection hole 17 of a sealing plate 11B of a sealed secondary battery according to a fifth embodiment. Like numbers are used to designate common portions shown in FIG. 7, and a detailed description of those portions is omitted.

The present embodiment differs from the fourth embodiment in the shape of a sealing body 90. The sealing body 90 of the fifth embodiment comprises only a disk 91 in the form of a flat plate.

An L-shaped notch 61 is formed covering the entire circumference of the upper edge of a circular recess 60. The outside diameter of the disk 91 that constitutes the sealing body 90 is substantially equal to or slightly smaller than the inside diameter of the notch 61. If the sealing body 90 is introduced into the recess 60 from the obverse side of the sealing plate 11B, therefore, the lower surface of the disk 91 contacts the bottom surface of the notch 61 so that the recess 60 is closed by the lower surface of the disk 91. In the fifth embodiment, the entire peripheral edge portion of the disk 91 is laser-welded to the surface of the sealing plate 11B, whereby the sealing body 90 is welded to the sealing plate 11B. In this way, the injection hole 17 is hermetically sealed by the sealing body 90.

In this arrangement, the notch 61 constitutes positioning means for positioning the sealing body 90 so as to close an opening of the recess 60, which is formed in a surface region of the sealing plate 11B around the injection hole 17 therein so as to communicate with the injection hole 17.

The fifth embodiment arranged in this manner is similar to the first to fourth embodiments as regards the manufacturing processes for the sealed secondary battery 10.

Thus, the same function and effect as those of the first to fourth embodiments can be achieved according to the fifth embodiment. In addition, according to the fifth embodiment, the sealing body 90 can be constructed by using the planar disk 91 only, so that the sealing body 90 is easier to produce.

According to each of the embodiments, as described in detail herein, there may be provided a sealed secondary battery, configured so that poor welding of a sealing body can be easily detected in the stage of a leak test, and a manufacturing method therefor.

The present embodiments are not limited to the above embodiments. In each of the embodiments, for example, the injection hole 17 is circular, and the sealing body 20, 50, 70, 80 or 90 is placed with the annular vacant space 100 secured above the surface region of the sealing plate 11B around the injection hole 17 therein. However, the injection hole 17 is not limited to the circular shape. For example, the sealing body may be arranged with a vacant space in the shape of a rectangular ring above the surface region of the sealing plate 11B around the injection hole 17 in a square shape therein. Alternatively, the sealing body may be arranged with a vacant space in the shape of a rectangular ring above the surface region of the sealing plate 11B around the injection hole 17 in a circular shape therein.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sealed secondary battery comprising:
   a container body comprising an opening and accommodating an electrode assembly and an electrolyte;
   a sealing plate which seals the opening of the container body, the sealing plate comprising an injection hole which is formed penetrating the sealing plate and through which the electrolyte is injected into the container body; and
   a sealing body which is formed of a hollow member including a first end face that is open and a second end face that is closed, and is positioned with a vacant space above a surface region of the sealing plate around the injection hole therein by providing a protrusion at a center part of the second end face, the protrusion having a length to project out from the first end face and an outside diameter smaller than that of the injection hole and inserting a portion of the protrusion projected out from the first end face into the injection hole, and which is welded at a peripheral edge portion thereof to the sealing plate, thereby sealing the injection hole, and
   wherein a gap which communicates with an inside and an outside of the container body is formed between the injection hole and the protrusion inserted into the injection hole, and the gap communicating with the vacant space in the hollow member and the gap completely surrounding the protrusion.

2. The sealed secondary battery of claim 1, further comprising a recess formed in a surface region of the sealing plate around the injection hole therein so as to communicate with the injection hole and be fitted with the sealing body from the first end face side.

3. The sealed secondary battery of claim 1, wherein the sealing body includes a flange at an outer edge of the first end face of the hollow member, and the portion of the protrusion projected from the first end face is inserted into the injection hole, thereby welding a peripheral edge portion of the flange disposed on the sealing plate to a plate portion of the sealing plate so that the hollow member covers the injection hole from the first end face.

4. The sealed secondary battery of claim 3, further comprising a recess formed in a surface region of the sealing plate around the injection hole therein so as to communicate with the injection hole and be fitted with the sealing body from the first end face side.

5. The sealed secondary battery of claim 1, wherein the protrusion has a rod shape.

* * * * *